Figure 1:
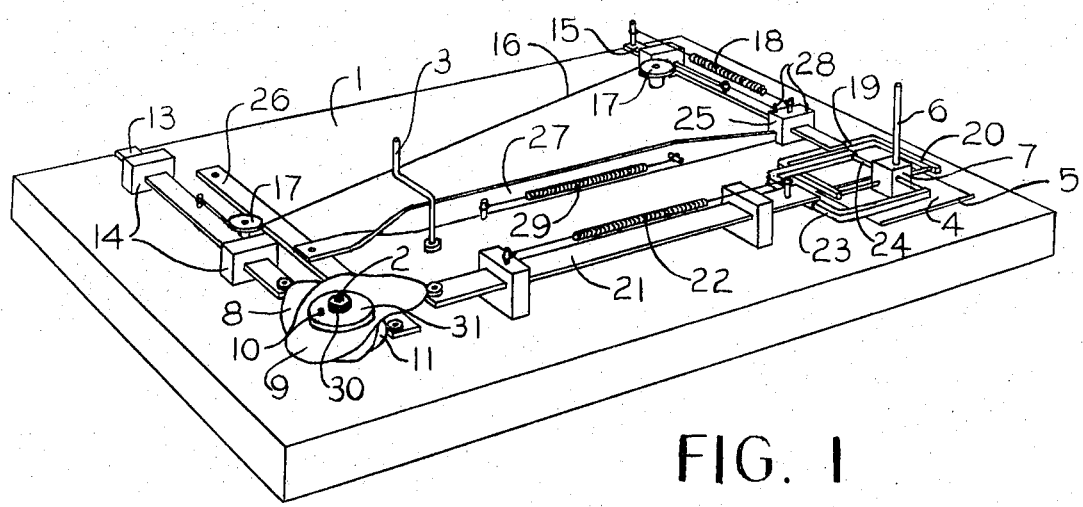

United States Patent [19]

Amelon

[11] 3,834,027

[45] Sept. 10, 1974

[54] DEVICE FOR TESTING CAM DESIGNS

[76] Inventor: Donald J. Amelon, Rt. 3, Jackson, Mo.

[22] Filed: Oct. 5, 1972

[21] Appl. No.: 295,229

[52] U.S. Cl. .............................................. 33/27 K
[51] Int. Cl. .......................................... B43l 11/00
[58] Field of Search ............... 33/18 B, 27 K, 27 L

[56] References Cited
UNITED STATES PATENTS

| | | | |
|---|---|---|---|
| 1,386,332 | 8/1921 | Hendrickson | 33/18 B |
| 1,883,204 | 10/1932 | Whitaker | 33/18 B |
| 3,293,753 | 12/1966 | Gage et al. | 33/27 L |
| 3,444,623 | 5/1969 | Wolf | 33/27 L |

*Primary Examiner*—Louis R. Prince
*Assistant Examiner*—Charles E. Phillips

[57] ABSTRACT

The disclosure relates to a device for testing two cam designs simultaneously, one cam designed for movement of a follower in the x axis and one designed for movement of a follower in the y axis. A spindle is provided for mounting sheet metal plate cams in the contour of the cam designs; associated mechanisms control the movement of a pen to write or draw a one line figure on a stiff card. The figure drawn may be compared directly to the one line figure which was the intended pattern of pen movement from which the two cams were designed.

2 Claims, 2 Drawing Figures

PATENTED SEP 10 1974　　3,834,027

DEVICE FOR TESTING CAM DESIGNS

This invention relates to a device to draw or write a line by a mounted pen that is moved by mechanical means in accordance with the peripheral contour of two synchronized rotating plate cams.

Drawing devices utilizing cams are already known in the art as exemplified by the patents to Wolf, U.S. Pat. No. 3,444,623 and to Gage, U.S. Pat. No. 3,293,753. The present invention introduces a new dimension in that the pen moves in direct relationship, in both the $x$ axis and the $y$ axis, to the changing radii of cams rather than in a curvalinear response pattern or in a response pattern that enlarges or diminishes the movement dictated by the contour of the cam edges.

The designing of plate cams may well fit within such studies as mechanical drawing, engineering drawing, design drafting, power mechanics, kinematics, or practical mechanical engineering. Any cam is a device to change rotary motion to straight-line or nearly straight-line motion. A plate cam is simply a flat plate whose outside edge is designed to be varying, specific distances from a base circle at different angles of rotation. Students in the above mentioned fields have generally studied cams and designed cams on a theoretical basis without actually building or testing the cams to test the theoretical designs.

It is the primary object of the present invention to provide a teaching device for testing the accuracy of the design of a pair of cams by moving a pen to draw a line which may be compared directly with a line which was used as the intended path for the pen from which the cams were originally designed.

It is a further object of this invention to provide a device which, when the cams being tested are rotated several revolutions in a single direction, is capable of repeating a single drawn line whose ends are not connected or of repeating several drawn lines whose ends are not connected. This is accomplished by a pen lifting mechanism actuated by a third cam rotated and synchronized with the two cams responsible for movement of the pen in the x and y axes.

Figure 2:
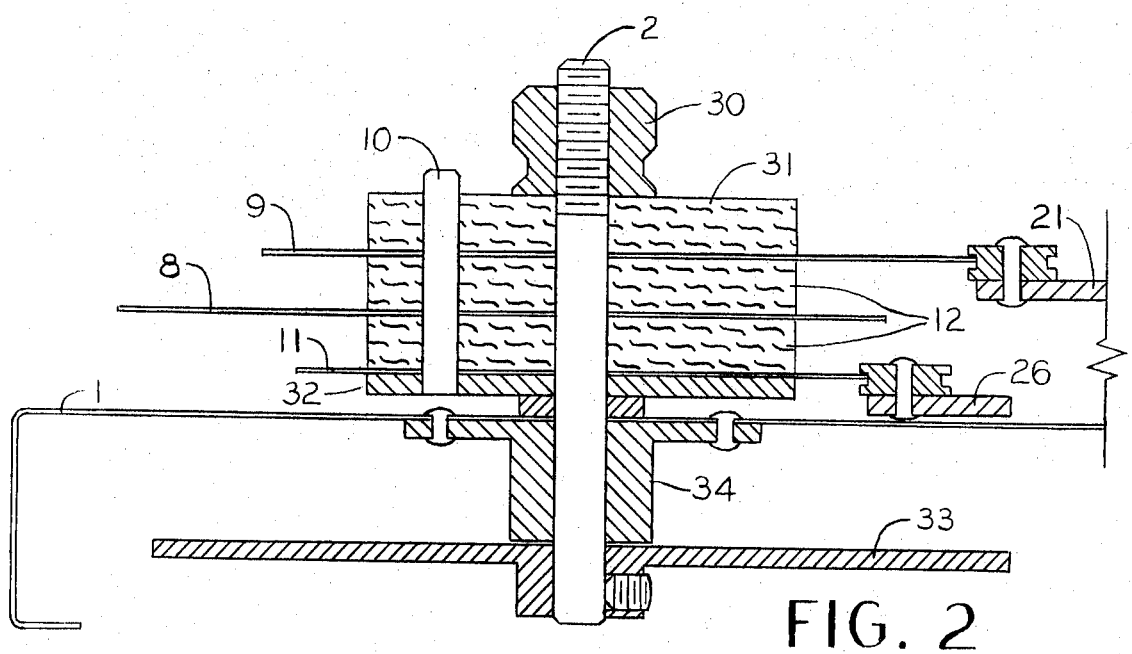

In accordance with these and other objects which will become apparent hereinafter, the preferred mode contemplated for the present invention is disclosed in the accompanying drawings wherein:

FIG. 1 is a perspective view of the device for testing cam designs as it might appear in operating position on a table top; and FIG. 2 is a section view through the cam spindle and associated parts of the device for testing cam designs.

Although several types of materials may be used for many parts, the materials mentioned in the following description are considered to be highly appropriate.

The entire mechanism is mounted above a supporting hollow sheet steel platform 1 except for the sprockets and chain that drive the cam spindle 2 from the operating crank 3. The cam spindle and the operating crank turn in bearings mounted in the horizontal platform.

In operation (when student made cams are being tested) an index card 4 is mounted in the sheet steel card frame 5 and a ball point pen 6 is mounted in the nylon pen block 7; the sheet steel vertical cam 8 and the sheet steel horizontal cam 9 are mounted on the steel cam spindle 2 and its steel drive pin 10 for positive drive and synchronization. The sheet steel lift cam 11 is located beneath the vertical cam. All three cams are separated from each other by flat circular fiber spacers 12 to allow freedom of movement of the roller followers.

As the cams revolve together, the vertical cam 8, engaging a roller follower, moves the steel vertical push bar 13 in the y axis (inward and outward from the cam spindle) sliding in nylon bearing blocks 14 on the platform. This movement is transferred in a parallel direction to the steel vertical pull bar 15 by means of a flexible steel cable 16 around two nylon pulleys 17 with fixed center locations. The steel vertical pull bar 15 slides in its two nylon bearing blocks. The vertical tension spring 18 keeps the vertical pull bar pulled downward, the flexible cable taut, the vertical push bar 13 downward and therefore the roller follower against the edge of the vertical cam 8. A steel yoke 19 is rigidly brazed to the lower end of the vertical pull bar 15; this yoke holds a brass rod 20 which passes through the pen block 7 and moves the block vertically but still allows the block to move horizontally. Through the action of the above described mechanism the pen is moved vertically in the y axis by the contour of the edge of the revolving vertical cam.

As the cams revolve together, the horizontal cam 9, engaging its roller follower, moves the steel horizontal push bar 21 to the right or to the left, in the x axis. This push bar slides in its nylon bearing blocks and is held leftward, keeping the roller follower against the edge of the horizontal cam, by action of its tension spring 22.

A steel yoke 23 is hinged at the right end of the horizontal push bar 21 so that the open end of the yoke may move up and down freely. This yoke holds a brass rod 24 which passes through the pen block 7 and moves the block horizontally, in the x axis, but allows the block to move vertically, in the y axis. The horizontal yoke 23 is positioned slightly above the vertical yoke 19 to allow for clearance and free movement of both. Through the action of the above described mechanism the pen is moved horizontally, in the x axis, by the contour of the edge of the revolving horizontal cam.

The horizontal yoke 23 is hinged at the right end of the horizontal push bar 21 and the lower bearing block 25 of the vertical pull bar lifts slightly to accomplish the lifting of the pen. The lifting of the pen is accomplished in the following manner. As the three cams revolve together and near the end of the planned revolution, a lobe on the edge of the lift cam 11, engaging its roller follower, pushes the lower end of the lift lever 26 to the right. The lift lever 26, pivoted at the top, then forces the wedge arm 27 to the right, which raises the lower bearing block 25 as the inclined plane of the wedge arm 27 slides in a mating groove in the bottom of the lower bearing block 25. The lower bearing block 25 is free to raise on two platform mounted guide pins 28 which hold the bearing block in position both vertically and horizontally. As the lower bearing block 25 raises it raises the lower end of the vertical pull bar 15 with its rigidly attached yoke 19 and rod 20. The rod 20 lifts the pen block 7 with its pen 6. A tension spring 29 is attached to the wedge arm 27 to pull it leftward so the roller follower of the lift lever 26 is held against the edge of the lift cam 11. As the cam spindle 2 is further rotated the pen is again lowered to writing position and the drawn line may be repeated. Multiple line drawings may be accomplished by the designing of multiple lobes on the lift cam 11 at appropriate angles of rotation.

A nut 30 and a large washer 31 hold the cams and spacers firmly against the drive plate 32 of the spindle. The steel drive plate 32 is welded or brazed to the spindle. A sprocket 33 is fitted to the lower end of the spindle and is driven by a roller chain from a smaller sprocket on the lower end of the operating crank 3. The spindle 2 rotates in a close fitting bearing 34 which is fastened to the platform 1. The crank 3 turns in a similar bearing.

While only one preferred embodiment of the above invention has been described herein, it will be apparent to those skilled in the art that many variations may be made. It is therefore the intention that the appended claims be interpreted as broadly as possible to include such variations.

What is claimed is:

1. A device for testing cam designs comprising a platform, a spindle rotatably mounted on said platform on which test cams may be mounted with means for mounting said cams, a crank mounted on said platform for turning said spindle by a chain and sprocket arrangement, a pen holder with a mounted pen, an index card holder on said platform to position an index card under said pen in writing position, a motion transfer system which moves said pen vertically (in the y axis) in direct 1:1 ratio with the variation in radial distance of the edge of a vertical test cam, said system consisting of a pair of parallel bars sliding in bearing blocks mounted on said platform and connected by a pulley and cable arrangement with one end of one bar fitted with a roller cam follower and one end of the other bar fitted with a yoke and rod attached to said pen holder and a spring to bias said cam follower against said cam, a motion transfer system which moves said pen horizontally (in the x axis) in direct 1:1 ratio with the variation in the radial distance of the edge of a horizontal test cam, said system consisting of a bar sliding in bearing blocks mounted on said platform with a roller cam follower at one end and a hinged yoke at the other end fitted with a rod and attached to said pen holder and a spring to bias said cam follower against said horizontal cam.

2. A device for testing cam designs as defined in claim 1 wherein the pen is lifted at the end of a line drawing operation by a motion transfer system consisting of a bar pivoting at one end on said frame and moving in a small arc at the other end by engagement of a roller cam follower with the edge of a third cam, an arm with an inclined top edge at one end fastened to and moving at right angles with said pivoting bar at the other end, and wherein one of said bearing blocks is capable of being lifted slightly through which the yoke end of one of said sliding bars moves and which has an angled groove in its bottom which matches the incline of the top edge of the above mentioned arm whereby movement of said bar will cause movement of said arm and lifting of said pen.

* * * * *